United States Patent
Kuo et al.

(10) Patent No.: US 8,851,387 B2
(45) Date of Patent: Oct. 7, 2014

(54) ANTI-COUNTERFEITING BOTTLE

(75) Inventors: Shih-Kang Kuo, Kaohsiung (TW);
Sung-Lin Chen, Kaohsiung (TW);
Long-Gee Liao, Pingtung County (TW);
Jhu-Yong Hsu, Kaohsiung (TW)

(73) Assignee: China Steel Corporation, Kaohsiung (TW)

( * ) Notice: Subject to any disclaimer, the term of this patent is extended or adjusted under 35 U.S.C. 154(b) by 217 days.

(21) Appl. No.: 13/115,127

(22) Filed: May 25, 2011

(65) Prior Publication Data

US 2012/0228388 A1    Sep. 13, 2012

(30) Foreign Application Priority Data

Mar. 11, 2011   (TW) .............................. 100108350 A

(51) Int. Cl.
G06K 19/06    (2006.01)
G06K 19/077   (2006.01)

(52) U.S. Cl.
CPC .............................. *G06K 19/07771* (2013.01)
USPC ........................................................ 235/492

(58) Field of Classification Search
USPC ........................................................ 235/492
See application file for complete search history.

(56) References Cited

U.S. PATENT DOCUMENTS

| 7,017,807 B2 * | 3/2006 | Kipp et al. .................... 235/385 |
| 2007/0176834 A1 * | 8/2007 | Mohammadian et al. .... 343/702 |
| 2009/0045959 A1 | 2/2009 | Adstedt et al. |
| 2010/0141384 A1 | 6/2010 | Chen |

FOREIGN PATENT DOCUMENTS

| TW | M259278 | 3/2005 |
| TW | 201019231 | 5/2010 |

* cited by examiner

*Primary Examiner* — Rafferty Kelly
(74) *Attorney, Agent, or Firm* — CKC & Partners Co., Ltd.

(57) ABSTRACT

An anti-counterfeiting bottle includes a metal cap, a bottle body and a RFID (Radio-Frequency Identification) tag. The RFID tag includes a grounded surface, a monopole antenna and a RFID chip. The grounded surface is attached to the bottle body. The monopole antenna is attached to the bottle and is electrically connected to the grounded surface. The RFID chip is attached to the bottle and is electrically connected to the monopole antenna and the grounded surface respectively, wherein the RFID chip, the monopole antenna and the grounded surface form a loop structure. When the RFID tag is torn up, the loop structure is destroyed as well, such that the RFID tag cannot be read anymore, thus achieving the anti-counterfeiting function.

6 Claims, 6 Drawing Sheets ize% ANTI-COUNTERFEITING BOTTLE

RELATED APPLICATIONS

This application claims priority to Taiwan Application Serial Number 100108350, filed Mar. 11, 2011, which is herein incorporated by reference.

BACKGROUND

1. Field of Invention

The present invention relates to an anti-counterfeiting bottle. More particularly, the present invention relates to a bottle having a metal cap which utilizes a RFID (Radio Frequency Identification) tag with a monopole antenna to achieve an anti-counterfeiting function.

2. Description of Related Art

With the continuous advance of technology, a RFID tag has been widely applied on a bottle cap of wine bottle, drink bottle, medicine bottle and cosmetic bottle, etc., as an anti-counterfeiting electronic tag. Once a user opens a bottle cap, an electronic tag attached on the bottle cap will be destroyed and invalid, thus achieving the object of one time anti-counterfeiting function. Besides, a RFID tag reader can be used to read and write data from/into multiple targets, thereby preventing personal errors and achieving the object of real-time processing messages. For example, all of the information including an item name, an item number, a storage location, a sale location and a transport process can be recorded in an electronic tag, and the electronic tag can be applied on anti-theft and safety-guard at the same time, so as to construct a complete anti-counterfeiting identification and anti-theft safety management system.

As to the RFID tag, because metal will reflect wireless radio frequency signals and moisture will absorb the wireless radio frequency signals, the metal and the moisture are the main interference sources for the RFID tag. The bottle caps of the products such as high-class wines are mostly made of metal shells, which often interfere with the readings of the RFID tags on the metal bottle caps. Hence, it still lacks an effective technical measure for using a RFID tag to perform an anti-counterfeiting function on the product such as high class wine.

In U.S. patent application Ser. No. 12/328,292, a conventional anti-counterfeiting RFID tag belonging to high frequency (HF) is disclosed, wherein a portion of the antenna of the RFID tag extend across the joint portion of the bottle cap. When turning to open the bottle cap, the RFID tag will be is destroyed. However, the disadvantages of this HF RFID tag are relatively short reading distance and high cost.

In U.S. patent application Ser. No. 11/840,156, another conventional anti-counterfeiting tag which is a UHF (Ultra High Frequency) tag is disclosed. This patent application encloses the outside of a bottle cap from top to bottom by using the UHF RFID tag. When the bottle cap is opened, the tag will be destroyed at the same time to achieve the anti-counterfeiting function. Although this conventional UHF tag can effectively overcome the moisture interference on the tag reading, yet this UHF tag still suffers from the metal interference, so that this UHF tag is not applicable to the metal cap.

Referring to FIG. 1, FIG. 1 is a schematic diagram showing another conventional RFID tag. The conventional RFID tag includes a wall plate 10, two conductive tags 12, a RFID device 14 and a reflection structure 16. The conductive tags 12 and the RFID device 14 are electrically connected and disposed on one surface of the wall plate 10. The RFID device 14 is electrically connected to the conductive tags 12, wherein there are two feed points 18 and 20 located between the RFID device 14 and the conductive tags 12. The reflection structure 16 is disposed on the other surface of the wall plate 10. When the conventional RFID tag is applied on a metal article, in order to prevent the metal interference, the thickness of the wall plate 10 needs to be quite large. However, the conventional RFID tag with the thick wallboard 10 is disadvantageously applicable to the metal cap which emphasizes on lightweight, thinness, and beautiful appearance, especially for a metal cap of a high class wine bottle.

Hence, there is a need to provide a bottle with a metal bottle cap to which an applicable RFID tag is applicable for overcoming the aforementioned problems.

SUMMARY

One aspect of the present invention is to provide an anti-counterfeiting bottle for preventing a RFID tag from being interfered by a metal cap of a bottle when the RFID tag is applied on the bottle with the metal cap.

According to the aforementioned aspect, an anti-counterfeiting bottle is provided. In one embodiment, the anti-counterfeiting bottle includes a metal cap, a bottle body and a RFID tag. The RFID tag includes a grounded surface, a monopole antenna and a RFID chip. The grounded surface is attached on the metal cap. The monopole antenna is attached to the bottle body, and is electrically connected to the monopole antenna and the grounded surface, wherein the RFID chip, the grounded surface and the monopole antenna form a loop structure.

It can be known from the embodiments of the present invention that, the anti-counterfeiting bottle can overcome the disadvantage of the conventional RFID tag suffering from the metal interference, and has the advantages of simple structure and low manufacturing cost.

It is to be understood that both the foregoing general description and the following detailed description are examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DESCRIPTION OF THE PREFERRED EMBODIMENTS

Figure 1:
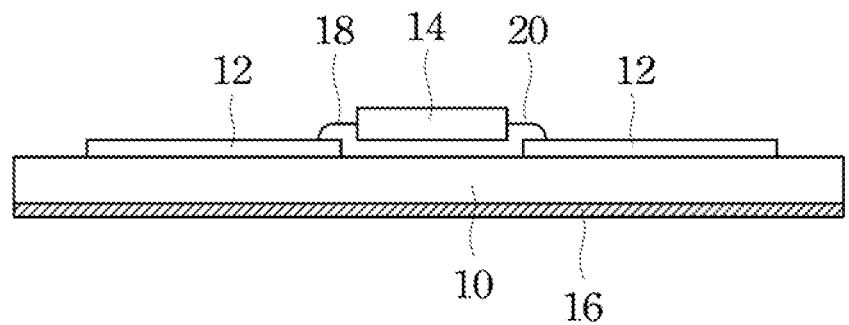
FIG. 1 is a schematic diagram showing a conventional RFID tag.

Reference will now be made in detail to the present preferred embodiments of the invention, examples of which are illustrated in the accompanying drawings. Wherever possible, the same reference numbers are used in the drawings and the description to refer to the same or like parts.

Figure 2:
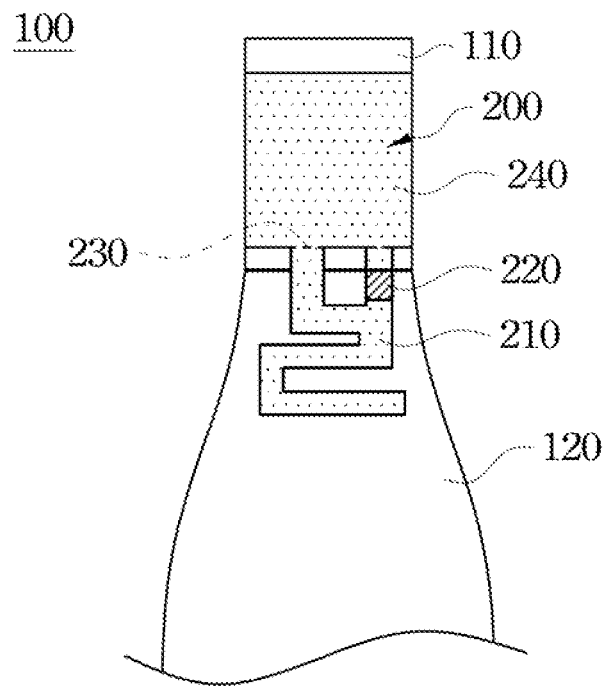
FIG. 2 is a schematic diagram showing the structure of a anti-counterfeiting bottle according to one embodiment of the present invention.
Figure 3:
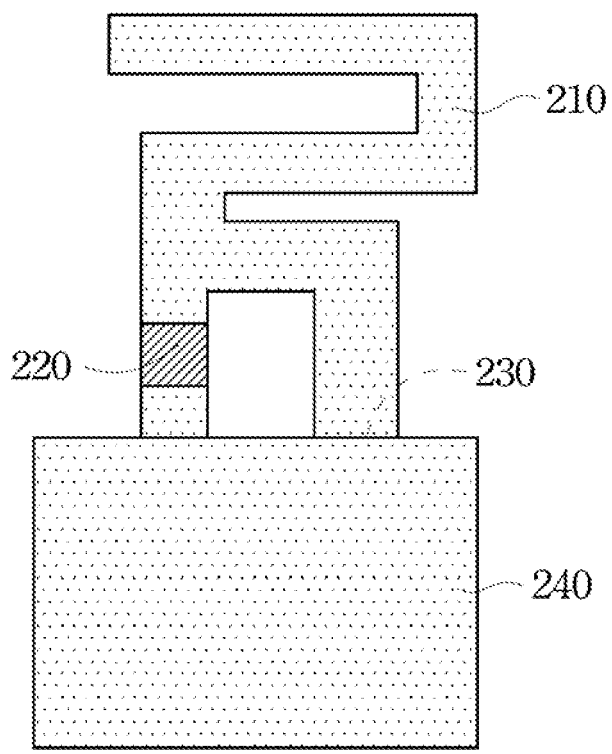
FIG. 3 is a schematic diagram showing the structure of a RFID tag according to the embodiment of the present invention.

Referring to FIG. 2 and FIG. 3, FIG. 2 is a schematic diagram showing the structure of an anti-counterfeiting bottle 100 according to one embodiment of the present invention, and FIG. 3 is a schematic diagram showing the structure of a RFID tag 200 according to the embodiment of the present invention. As shown in FIG. 2, the anti-counterfeiting bottle 100 includes a metal cap 110, a bottle body 120 and the RFID tag 200. As shown in FIG. 2 and FIG. 3, the RFID tag 200 includes a monopole antenna 210, a RFID chip 220 and a grounded surface 240. The monopole antenna 210 is a planar antenna structure, and is disposed on one side of the grounded surface 240 and is electrically connected to the grounded surface 240. In one embodiment, the monopole antenna 210 and the grounded surface 240 are formed from the same material. In another embodiment, the monopole antenna 210 and the grounded surface 240 are monolithically formed. In another embodiment, the grounded surface 240 and the monopole antenna 210 are co-planar.

As shown in FIG. 2, the grounded surface 240 is attached to the metal cap 110, and the monopole antenna 210 is attached to the bottle body 120 and is electrically connected to the grounded surface 240. One feature of the present invention is to use the grounded surface 240 to reduce the interference to antenna signals from the metal cap 110. The RFID chip 220 is attached to the bottle body 120 and is electrically connected to the monopole antenna 210 and the grounded surface 240 respectively, wherein the RFID chip 220, the grounded surface 240 and the monopole antenna 210 form a loop structure. When the monopole antenna 210 receives signals to access the contents of the RFID chip 220, the grounded surface 240 can prevent signals from being interfered by the reflection of the metal cap 210. If the loop structure is destroyed, the degree of impedance matching between the monopole antenna 210 and the RFID chip 220 will be greatly decreased, such that the RFID tag 200 cannot be read anymore, thus achieving the anti-counterfeiting function. In one embodiment, if the material of the RFID tag 200 cannot be torn up easily, then a perforation line 230 is formed at a joint of the monopole antenna 210 and the grounded surface 240, so that a user may turn the metal cap 110 conveniently to open the bottle 100. When the bottle 100 is opened, the RFID tag 200 will be broken along the perforation line 230 to destroy the aforementioned loop structure, such that the RFID tag 200 cannot be read anymore.

Hereinafter, the situation of the RFID tag 200 attached to a metal surface is simulated for explaining that when being attached to the metal surface, the RFID tag 200 of the present invention really has excellent antenna performance. In general, impedance matching and antenna gain are often used to evaluate the performance of an antenna. Herein, comparisons of the impedance matching and the antenna gain between a conventional Alien 9540 RFID tag and the RFID tag 200 which are attached to or disposed away from the metal surface are made, wherein the conventional Alien 9540 RFID tag uses a dipole antenna, and the RFID tag 200 uses the monopole antenna.

Figure 4A:
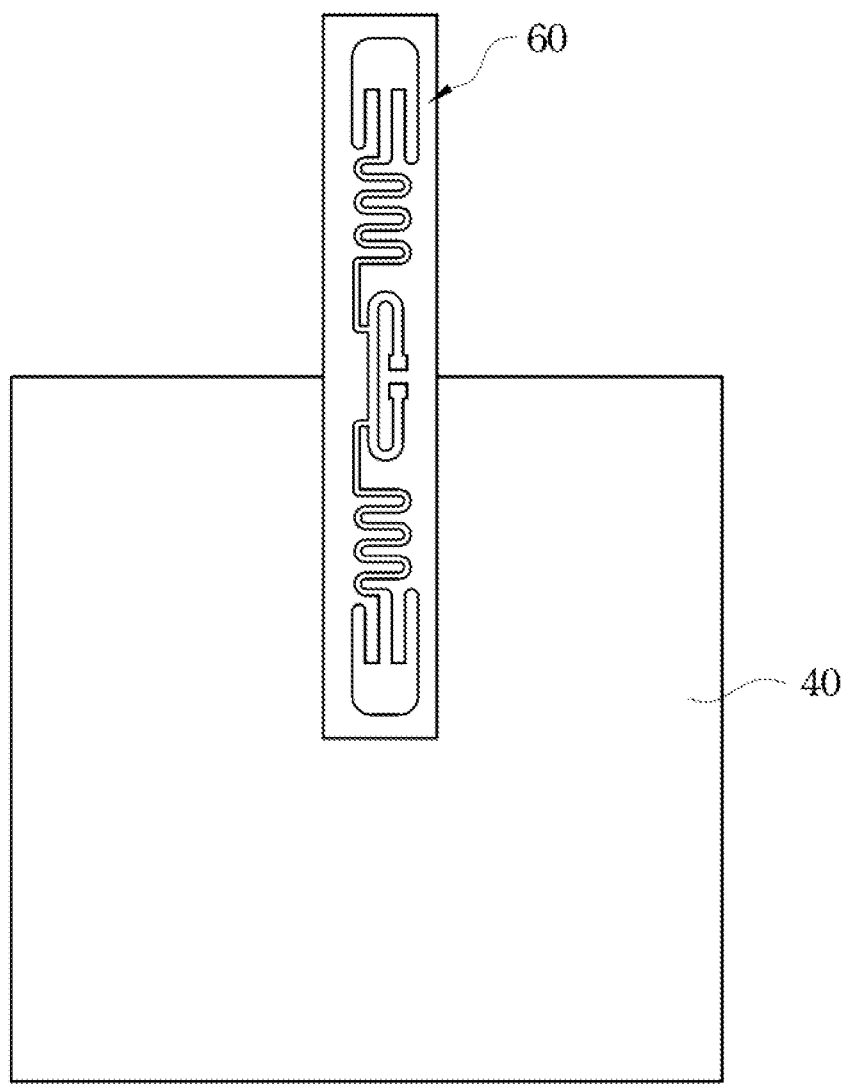
FIG. 4A is a schematic diagram showing a conventional Alien 9540 RFID tag attached to a metal surface.
Figure 4B:
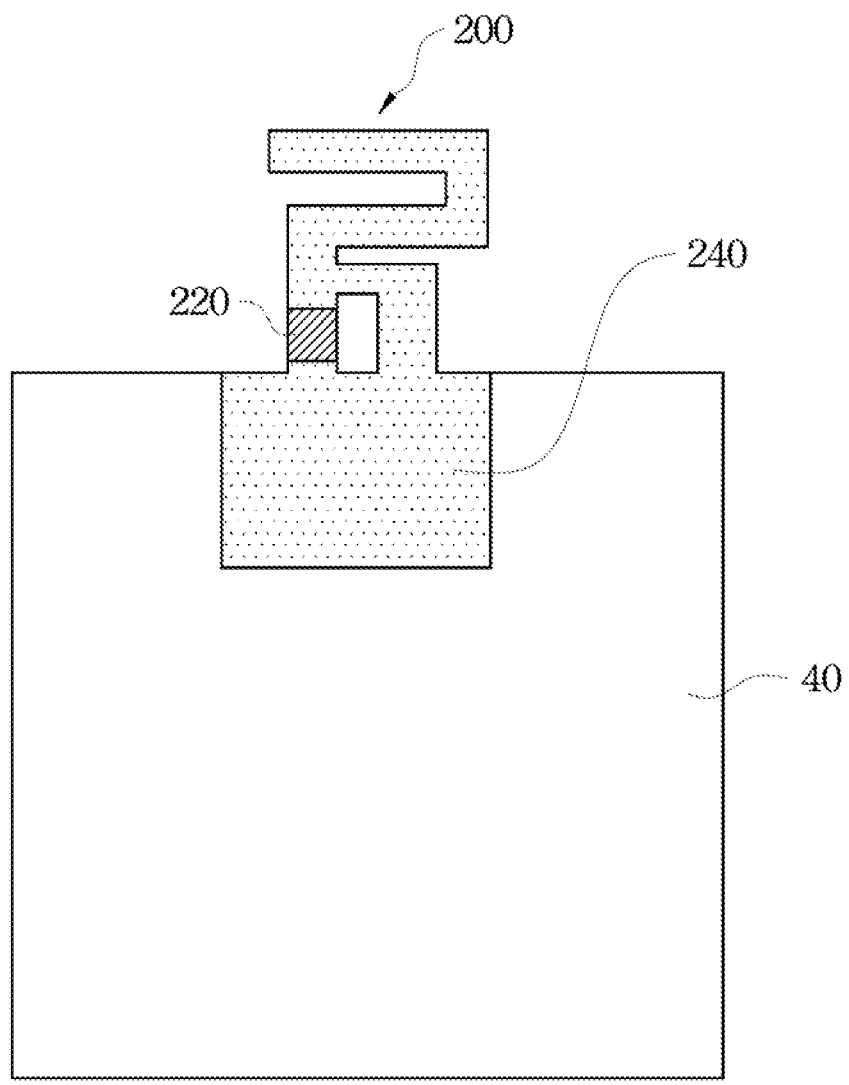
FIG. 4B is a schematic diagram showing the RFID tag attached to a metal surface according to the embodiment of the present invention.

Referring to FIG. 4A and FIG. 4B, FIG. 4A is a schematic diagram showing a conventional Alien 9540 RFID tag 60 attached to the metal surface 40, and FIG. 4B is a schematic diagram showing the RFID tag 200 of the present invention attached to the metal surface 40, wherein one half area of the conventional Alien 9540 RFID tag 60 is attached to the metal surface 40, and the grounded surface 240 of the RFID tag 200 is attached to the metal surface 40 for simulating the embodiment of the present invention.

Figure 5A:
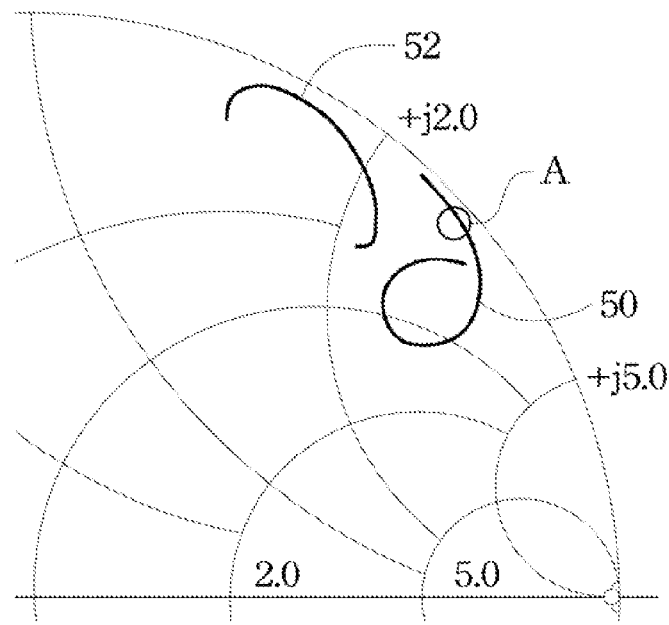
FIG. 5A is a smith chart illustrating the simulation results of impedance variations of the Alien 9540 RFID tag, wherein the Alien 9540 RFID tag is disposed away from or attached to the metal surface.
Figure 5B:
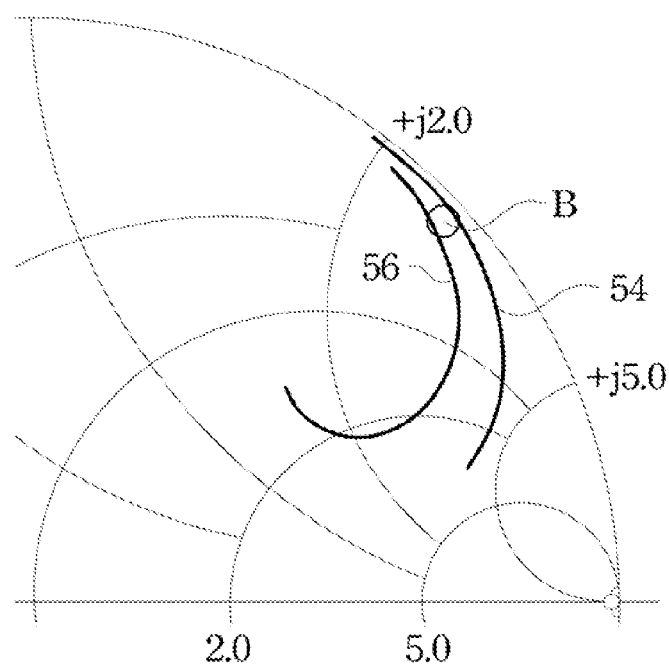
FIG. 5B is a smith chart illustrating the simulation results of impedance variations of the RFID tag according to the embodiment of the present invention, wherein the RFID tag is disposed away from or attached to the metal surface.

Also referring to FIG. 5A and FIG. 5B, FIG. 5A and FIG. 5B are smith charts illustrating the respective simulation results of impedance variations of the Alien 9540 RFID tag 60 and the RFID tag 200, wherein the Alien 9540 RFID tag 60 and the RFID tag 200 are disposed away from or attached to the metal surface. As shown in FIG. 5A, a curve 50 represents the antenna impedance of the Alien 9540 RFID tag 60s disposed away from the metal surface 40. A curve 52 represents the antenna impedance of the Alien 9540 RFID tag 60 attached to the metal surface 40. An area A represents the area in which the antenna impedance still can match the chip impedance. When the Alien 9540 RFID tag 60 is attached to the metal surface 40, the variation of the antenna impedance of the Alien 9540 RFID tag 60 is quite large (from the curve 50 to curve 52), and thus the antenna impedance is located away from the area A, meaning that the antenna impedance of the Alien 9540 RFID tag 60 can not match the chip impedance thereof. On the other end, as shown in FIG. 5B, a curve 54 represents the antenna impedance of the RFID tag 200 disposed away from the metal surface 40. A curve 56 represents the antenna impedance of the RFID tag 200 attached to the metal surface 40. An area B represents the area in which the antenna impedance matches the chip impedance. When the RFID tag 200 is attached to the metal surface 40, the antenna impedance of the RFID tag 200 is relatively smaller (from curve 54 to curve 56), and is still within the area B, meaning that the antenna impedance of the RFID tag 200 still matches the chip impedance thereof. Thus, the RFID tag 200 of the present invention may effectively reduce the metal interference, and still functions normally when getting close or being attached to a metal article.

TABLE 1

|  | Conventional Alien 9540 RFID tag | RFID tag of the present invention |
| --- | --- | --- |
| Disposed away from metal | 1.25 dBi | 2.15 dBi |
| Attached to metal | 0.42 dBi | 2.54 dBi |

Furthermore, referring to Table 1, Table 1 shows simulation results of the antenna gains of the conventional Alien 9540 RFID tag 60 and RFID tag 200 of the present invention, wherein the Alien 9540 RFID tag 60 and the RFID tag 200 are disposed away from or attached to the metal surface 40. It can be known from Table 1 that, when being attached to the metal surface 40, the antenna gain of the conventional Alien 9540 RFID tag 60 is greatly decreased, and on the contrary, that of the RFID tag 200 of the present invention is increased. Thus, the conventional Alien 9540 RFID tag has worse anti-metal performance, and due to the influence of the grounded surface 240, even if being attached to the metal surface 40, the gain of the monopole antenna 210 of the RFID tag 200 will not be affected but benefited therefrom.

Figure 6A:
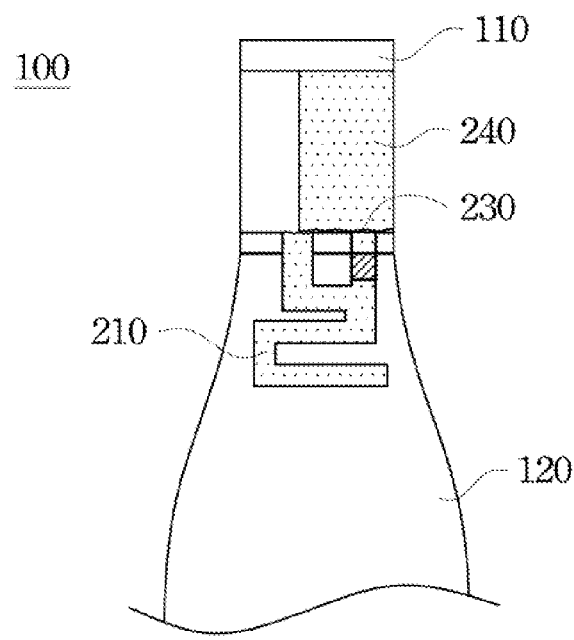
FIG. 6A is a schematic diagram illustrating the breaking of a perforation line of an anti-counterfeiting bottle according to one embodiment of the present invention.
Figure 6B:
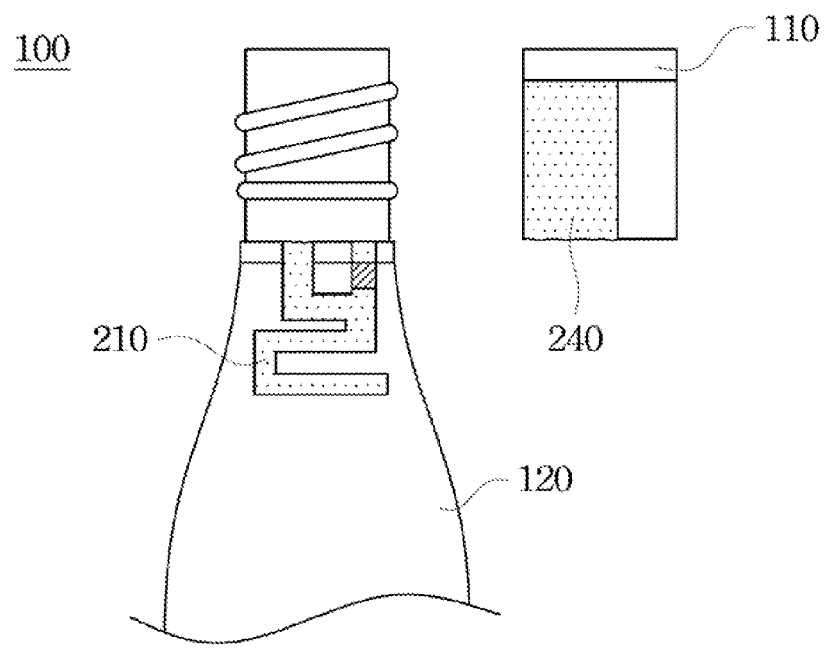
FIG. 6B is a schematic diagram illustrating the separation of a metal cap and a bottle body of the anti-counterfeiting bottle according to the embodiment of the present invention.

Referring to FIG. 6A and FIG. 6B, FIG. 6A is a schematic diagram illustrating the breaking of the perforation line of the anti-counterfeiting bottle according to the embodiment of this invention, and FIG. 6B is a schematic diagram illustrating the separation of the metal cap and the bottle body of the anti-counterfeiting bottle according to the embodiment of this invention. In one embodiment, when the metal cap 110 is turned, the RFID tag 200 with the monopole antenna 210 is broken along the perforation line 230 to separate the grounded surface 240 and the monopole antenna 210. Thus, the loop structure formed by the RFID chip 220, the grounded surface 240 and the monopole antenna 210 is destroyed, such that the RFID tag 200 cannot be read anymore, thereby achieving the anti-counterfeiting function. Moreover, the metal cap 110 and the bottle body 120 after separation are as shown in FIG. 6B.

It can be known from the embodiments of the present invention that, the anti-counterfeiting bottle can overcome the disadvantage of the conventional RFID tag suffering from the metal interference, and has the advantages of simple structure and low manufacturing cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An anti-counterfeiting bottle, comprising:
    a metal cap;
    a bottle body;
    a RFID (Radio Frequency identification) tag, comprising:
        a grounded surface attached to the metal cap;
        a monopole antenna which is attached to the botte body without substantially contacting the metal cap and is electrically connected to the grounded surface; and
        a RFID chip which is attached to the bottle body and is electrically connected to the monopole antenna and the grounded surface respectively, wherein the RFID chip, the monopole antenna and the grounded surface form a loop structure; and
    a perforation line formed at a joint of the monopole antenna and the grounded surface, wherein when the metal cap is turned, the RFID tag is broken along the perforation line to separate the grounded surface and the monopole antenna, thereby destroying the loop structure, such that the RFID tag cannot be read anymore, thus achieving anti-counterfeiting function.

2. The anti-counterfeiting bottle of claim 1, wherein the grounded surface and the monopole antenna are formed from the same material.

3. The anti-counterfeiting bottle of claim 1, wherein the grounded surface and the monopole antenna are monolithically formed.

4. The anti-counterfeiting bottle of claim 1, wherein the grounded surface of the RFID tag and the monopole antenna are co-planar.

5. The anti-counterfeiting bottle of claim 1, wherein when the metal cap is turned, the RFID tag is broken along the perforation line, and the metal cap is removed from the bottle body, the ground surface of the RFID tag remains on the metal cap, and the monopole antenna of the MD tag remains on the bottle body.

6. The anti-counterfeiting bottle of claim 1, wherein a portion of the monopole antenna is disposed between the RFID chip and the grounded surface.

* * * * *